United States Patent
Lee et al.

(10) Patent No.: US 9,606,265 B2
(45) Date of Patent: Mar. 28, 2017

(54) ADHESIVE COMPOSITION FOR POLARIZING PLATE, POLARIZING PLATE USING THE SAME, AND OPTICAL MEMBER INCLUDING THE SAME

(71) Applicants: Tae Hyun Lee, Uiwang-si (KR); Ik Hwan Cho, Uiwang-si (KR); Mi Yeon Yu, Uiwang-si (KR); Do Heon Lee, Uiwang-si (KR); In Cheon Han, Uiwang-si (KR)

(72) Inventors: Tae Hyun Lee, Uiwang-si (KR); Ik Hwan Cho, Uiwang-si (KR); Mi Yeon Yu, Uiwang-si (KR); Do Heon Lee, Uiwang-si (KR); In Cheon Han, Uiwang-si (KR)

(73) Assignee: CHEIL INDUSTRIES, INC., Gumi-Si, Kyeongsangbuk-Do (KR)

( * ) Notice: Subject to any disclaimer, the term of this patent is extended or adjusted under 35 U.S.C. 154(b) by 639 days.

(21) Appl. No.: 13/931,838

(22) Filed: Jun. 29, 2013

(65) Prior Publication Data

US 2014/0000482 A1 Jan. 2, 2014

(30) Foreign Application Priority Data

Jun. 29, 2012 (KR) .......... 10-2012-0071165
Jan. 31, 2013 (KR) .......... 10-2013-0011026

(51) Int. Cl.
| | | |
|---|---|---|
| C09B 67/00 | (2006.01) | |
| G02B 1/10 | (2015.01) | |
| C09J 163/00 | (2006.01) | |
| C08G 59/66 | (2006.01) | |
| G02B 5/30 | (2006.01) | |

(52) U.S. Cl.
CPC .......... *G02B 1/105* (2013.01); *C08G 59/66* (2013.01); *C09J 163/00* (2013.01); *G02B 5/3033* (2013.01)

(58) Field of Classification Search
CPC ...... G02B 1/105; G02B 5/3033; C08G 59/66; C09J 163/00
See application file for complete search history.

(56) References Cited

U.S. PATENT DOCUMENTS

2010/0208343 A1* 8/2010 Yoshida et al. .......... 359/485

FOREIGN PATENT DOCUMENTS

| CN | 1886437 A | 12/2006 |
|---|---|---|
| CN | 102471642 A | 5/2012 |
| JP | 2008-233874 A | 10/2008 |
| JP | 2009-001655 A | 1/2009 |
| KR | 10-2012-0044237 A | 5/2012 |
| KR | 10-2012-0109411 A | 10/2012 |
| TW | 1337615 B | 2/2011 |

(Continued)

OTHER PUBLICATIONS

Office Action mailed Aug. 4, 2014 in corresponding Chinese Patent Application No. 201310268429.4.
(Continued)

*Primary Examiner* — Kaj K Olsen
*Assistant Examiner* — Alexander Polyansky
(74) *Attorney, Agent, or Firm* — Lee & Morse, P.C.

(57) ABSTRACT

An adhesive composition for polarizing plates, a polarizing plate using the same, and an optical member including the same, the adhesive composition including an epoxy compound, a (meth)acrylic compound, and a polyfunctional thiol compound.

16 Claims, 1 Drawing Sheet

(56) References Cited

FOREIGN PATENT DOCUMENTS

WO  WO-2008/090815 A1  7/2008
WO  WO-2011/102286 A1  8/2011

OTHER PUBLICATIONS

Office Action mailed Sep. 9, 2014 in corresponding Taiwanese Patent Application No. 102123272.
Office Action mailed Jul. 14, 2015 in corresponding Korean Patent Application No. 10-2013-0011026.

* cited by examiner

ADHESIVE COMPOSITION FOR POLARIZING PLATE, POLARIZING PLATE USING THE SAME, AND OPTICAL MEMBER INCLUDING THE SAME

CROSS-REFERENCE TO RELATED APPLICATIONS

Korean Patent Application No. 10-2012-0071165, filed on Jun. 29, 2012, and Korean Patent Application No. 10-2013-0011026, filed on Jan. 31, 2013, in the Korean Intellectual Property Office, are incorporated by reference herein in their entirety.

BACKGROUND

1. Field

Embodiments relate to an adhesive composition for polarizing plates, a polarizing plate using the same, a method for preparing the same, and an optical member including the same.

2. Description of the Related Art

Adhesives for polarizing plates may be used to attach a protective film to one or both sides of a polarizer including a PVA film. As such adhesives for polarizing plates, hydrophilic and water-soluble aqueous PVA adhesives may be used. However, a polarizing plate prepared using aqueous adhesives may suffer dimensional change due to heat from a backlight, causing localized screen distortion. As a result, partial light leakage may become significant in the case in which a dark image is displayed on the screen. Thus, the use of a cation polymerizable UV curing adhesive may be used instead of the aqueous adhesives.

SUMMARY

Embodiments are directed to an adhesive composition for polarizing plates, a polarizing plate using the same, a method for preparing the same, and an optical member including the same.

The embodiments may be realized by providing an adhesive composition for polarizing plates, the adhesive composition including an epoxy compound, a (meth)acrylic compound, and a polyfunctional thiol compound.

The polyfunctional thiol compound may be present in an amount of about 0.1 parts by weight to about 15 parts by weight, based on 100 parts by weight of the epoxy compound, the (meth)acrylic compound, and the polyfunctional thiol compound.

The polyfunctional thiol compound may be present in an amount of about 0.1 parts by weight to less than about 5 parts by weight, based on 100 parts by weight of the epoxy compound, the (meth)acrylic compound, and the polyfunctional thiol compound.

A weight ratio of the epoxy compound to the (meth)acrylic compound may be about 50:50 to about 90:10.

The polyfunctional thiol compound may have a structure represented by Formula 1:

[Formula 1]

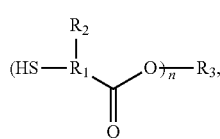

wherein, in Formula 1, n is an integer from 2 to 10, $R_1$ is a substituted or unsubstituted $C_1$ to $C_{10}$ alkylene group, $R_2$ is a substituted or unsubstituted $C_1$ to $C_{10}$ alkyl group, and $R_3$ is a substituted or unsubstituted $C_1$ to $C_{10}$ alkylene group, or a functional group represented by Formula 2:

[Formula 2]

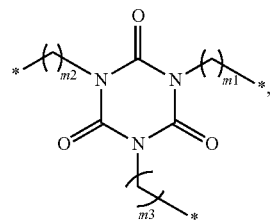

wherein, in Formula 2, $m_1$, $m_2$, and $m_3$ are each independently an integer from 1 to 5; and * is a binding site to —O— in Formula 1.

The polyfunctional thiol compound may include 1,4-bis(3-mercaptobutyryloxy)butane, 1,3,5-tris(3-mercaptobutyryloxyethyl)-1,3,5-triazine-2,4,6(1H,3H,5H)-trione, pentaerythritol tetrakis(3-mercaptobutyrate), or a mixture thereof.

The epoxy compound may include an alicyclic epoxy compound, an aromatic epoxy compound, an aliphatic epoxy compound, a hydrogenated epoxy compound, or a mixture thereof.

The (meth)acrylic compound may include a monofunctional (meth)acrylate having at least one hydrophilic group, a polyfunctional (meth)acrylate of a polyhydric alcohol having 2 or more hydroxyl groups, or a mixture thereof.

The polyfunctional (meth)acrylate of a polyhydric alcohol having 2 or more hydroxyl groups may be present in the (meth)acrylic compound in an amount of about 10 wt % or less.

The (meth)acrylic compound may include the a polyfunctional (meth)acrylate of the polyhydric alcohol having 2 or more hydroxyl groups, the polyhydric alcohol having 2 or more hydroxyl groups including a linear or branched $C_3$ to $C_{20}$ polyhydric alcohol, a cyclic $C_6$ to $C_{20}$ polyhydric alcohol containing an isocyanurate group, or a mixture thereof.

The adhesive composition for polarizing plates may further include a photoinitiator.

The photoinitiator may include a mixture of a photo-radical polymerization initiator and a photo-cationic polymerization initiator.

The adhesive composition may include about 1 part by weight to about 90 parts by weight of the epoxy compound; about 1 part by weight to about 90 parts by weight of the (meth)acrylic compound; about 0.1 parts by weight to about 15 parts by weight of the polyfunctional thiol compound; and about 0.1 part by weight to about 10 parts by weight of the photoinitiator, wherein all amounts are based on 100 parts by weight of the epoxy compound, the (meth)acrylic compound, and the polyfunctional thiol compound.

The adhesive composition may have a viscosity at 25° C. of about 40 cPs to about 135 cPs.

The polyfunctional thiol compound may include two to six thiol groups.

The embodiments may also be realized by providing a polarizing plate including a polarizer; and a protective film stacked on one or both sides of the polarizer, the protective film being attached with an adhesive layer, wherein the adhesive layer is formed from an adhesive composition for polarizing plates that includes a polyfunctional thiol compound.

The embodiments may also be realized by providing a polarizing plate including a polarizer; and a protective film stacked on one or both sides of the polarizer, the protective film being attached with an adhesive layer, wherein the adhesive layer is prepared from the adhesive composition for polarizing plates according to an embodiment.

The embodiments may also be realized by providing an optical member including an adhesive film, the adhesive film being prepared from the adhesive composition for polarizing plates according to an embodiment.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
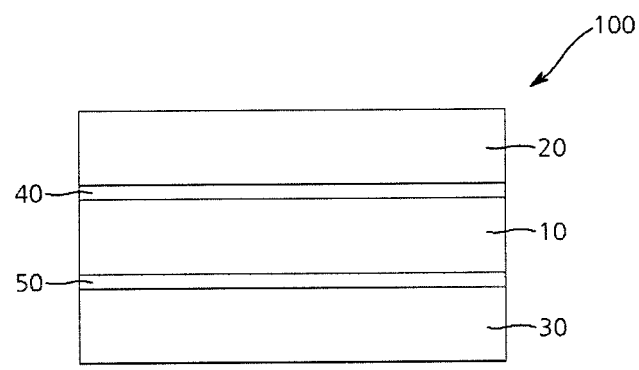
FIG. 1 illustrates a sectional view of a polarizing plate in accordance with an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

In accordance with an embodiment, an adhesive composition for polarizing plates may be used to attach a protective film such as TAC (triacetyl cellulose), PET (polyethylene terephthalate), PC (polycarbonate), COP (cyclic olefin polymer), acryl films, and the like, to one or both sides of a polarizer.

In an embodiment, the adhesive composition for polarizing plates may include (A) an epoxy compound, (B) a (meth)acrylic compound, and (C) a polyfunctional thiol compound.

Herein, the term "compound" may refer to monomers, oligomers, resins, and the like. Herein, the term "(meth) acrylic" may refer to acrylic and/or methacrylic.

Epoxy Compound

The epoxy compound may impart adhesion between the polarizer and the protective film, while providing high reliability with an adhesive layer formed from the adhesive composition based on inherent rigidity of epoxies. In addition, the epoxy compound may provide cohesion by entanglement of molecular chains with a (meth)acrylic compound, and chain transfer coupling with a hydrophilic group of the (meth)acrylic compound.

In an implementation, the epoxy compound may be a cationic epoxy compound.

The epoxy compound may have a high glass transition temperature (Tg) to impart durability by supporting a structure of an adhesive layer formed from the adhesive composition as a cured product, and to provide adhesion at an interface between a polarizer and a protective film through excellent wettability and chemical reaction with hydroxyl groups generated upon curing reaction.

The epoxy compound may have a glass transition temperature (Tg) of about 50° C. to about 250° C., e.g., about 60° C. to about 150° C. Within this range, the epoxy compound may help provide high durability as well as strong adhesion at an interface between the polarizer and the protective film.

The epoxy compound may be an alicyclic epoxy compound, an aromatic epoxy compound, an aliphatic epoxy compound, a hydrogenated epoxy compound, or a mixture thereof. The epoxy compound may include at least one epoxy group.

The alicyclic epoxy compound may include at least one epoxy group bound to an alicyclic ring, e.g., a $C_5$ to $C_{20}$ alicyclic ring. The alicyclic epoxy compound may be an alicyclic diepoxy carboxylate. Examples of the alicyclic epoxy compound may include 3,4-epoxycyclohexylmethyl-3',4'-epoxycyclohexane carboxylate, epoxycyclohexyl-5,5-spiro-3,4-epoxy)cyclohexane meta-dioxane, bis(3,4-epoxycyclohexylmethyl)adipate, bis[(3,4-epoxy-6-methylcyclohexyl)]adipate, 3,4-epoxy-6-methylcyclohexyl-3',4'-epoxy-6'-methylcyclohexane carboxylate, ε-caprolactone-modified 3,4-epoxycyclohexylmethyl-3',4'-epoxycyclohexane carboxylate, trimethylcaprolactone modified 3,4-epoxycyclohexylmethyl-3',4'-epoxycyclohexane carboxylate, β-methyl-δ-valerolactone-modified 3,4-epoxycyclohexylmethyl-3',4,'-epoxycyclohexane carboxylate, methylene bis(3,4-epoxycyclohexane), di(3,4-epoxycyclohexylmethyl)ether of ethylene glycol, ethylene glycol bis(3,4-epoxycyclohexanecarboxylate), dioctyl epoxyhexahydro phthalate, epoxyhexahydro phthalic acid di-2-ethylhexyl, and the like.

Examples of the aromatic epoxy compound may include bisphenol A, bisphenol F, phenol novolac, cresol novolac, bisphenol A-novolac, dichloropentadiene novolac, glycidyl ether of triphenolmethane, triglycidyl-p-aminophenol, tetraglycidyl methylenedianiline, and the like.

Examples of the aliphatic epoxy compound may include 1,4-butanediol diglycidyl ether, 1,6-hexanediol diglycidyl ether, neopentylglycol diglycidyl ether, trimethylolpropane triglycidyl ether, polyethylene glycol diglycidyl ether, glycerin triglycidyl ether, polypropylene glycol diglycidyl ethers; polyglycidyl ethers of polyether polyols obtained by adding one or more kinds of alkylene oxide to aliphatic polyhydric alcohols such as ethylene glycol, propylene glycol, glycerin, and the like; diglycidyl esters of aliphatic long-chain dibasic acids; monoglycidyl ethers of aliphatic higher alcohols; glycidyl ethers of higher fatty acids; epoxidized soybean oil; butyl epoxystearate; octyl epoxystearate; epoxidized linseed oil; epoxidized polybutadiene, and the like.

The hydrogenated epoxy compound refers to a resin obtained through selective hydrogenation of an aromatic epoxy resin in the presence of a catalyst under pressure. Examples of the aromatic epoxy resin may include bisphenol type epoxy resins such as diglycidyl ether of bisphenol A, diglycidyl ether of bisphenol F, diglycidyl ether of bisphenol S, and the like; novolac type epoxy resins, such as a phenol novolac epoxy resin, a cresol novolac epoxy resin, a hydroxybenzaldehyde phenol novolac epoxy resin, and the like; polyfunctional epoxy resins, such as a glycidyl ether of tetrahydroxy phenylmethane, a glycidyl ether of tetrahydroxy benzophenone, epoxidized polyvinylphenol, and the like. Although the hydrogenated epoxy resin may be obtained by adding hydrogen to a mother nucleus of the aromatic epoxy resin, a glycidyl ether of hydrogenated bisphenol A may also be used.

The epoxy compound may be present in an amount of about 1 part by weight to about 90 parts by weight, based on 100 parts by weight of total of (A), (B), and (C) (i.e., (A)+(B)+(C) or 100 parts by weight of the epoxy compound, the (meth)acrylic compound, and the polyfunctional thiol compound). Within this content range of the epoxy compound, the composition may provide good adhesion between the polarizer and the protective film, may not suffer from an excessive increase in viscosity, thereby preventing deterioration of wettability to the polarizer, may help prevent the adhesive layer from becoming brittle due to excessive increase in modulus, and may help provide crack resistance and cutability to the adhesive layer. In an implementation, the epoxy compound may be present in an amount of about 40 parts by weight to about 90 parts by weight, e.g., about 50 parts by weight to 70 parts by weight.

(Meth)Acrylic Compound

The (meth)acrylic compound may undergo radical polymerization upon electromagnetic irradiation. In addition, the (meth)acrylic compound may exhibit high reactivity without suffering reaction interference by moisture of the polarizer. Further, the (meth)acrylic compound may help improve adhesion at an interface with the polarizer or the protective film during curing, and may create a chain transfer bond with an activated epoxy compound.

The (meth)acrylic compound may include a non-thiol (—SH) type (meth)acrylic compound, e.g., not including a —SH group.

The (meth)acrylic compound may be or may include (b1) a monofunctional (meth)acrylate, (b2) a polyfunctional (meth)acrylate, or a mixture thereof. The polyfunctional (meth)acrylate may include about 2 or more, e.g., about 2 to about 6, (meth)acrylate groups.

The (b2) polyfunctional (meth)acrylate may be present in an amount of about 10 wt % or less, e.g., about 0.01 wt % to about 10 wt %, about 5.0 wt % to about 9.5 wt %, or about 8.0 wt % to about 9.1 wt %, based on a total weight of (b1) and (b2), i.e. a total weight of (B) the (meth)acrylic compound. Within this range, the (meth)acrylic compound may help prevent deterioration in adhesion caused by curing shrinkage.

The (b1) monofunctional (meth)acrylate may include a monofunctional (meth)acrylate having at least one hydrophilic group. The hydrophilic group may include a hydroxyl group, a carboxylic acid group, or mixtures thereof. In an implementation, the hydrophilic group may include the hydroxyl group.

The (b1) monofunctional (meth)acrylate may include at least one selected from among monofunctional (meth)acrylates containing $C_1$ to $C_{20}$ alkyl group having at least one hydrophilic group, monofunctional (meth)acrylates containing $C_3$ to $C_{20}$ alicyclic group having at least one hydrophilic group, and monofunctional (meth)acrylates containing $C_6$ to $C_{20}$ aryl group having at least one hydrophilic group.

In an implementation, the (b1) monofunctional (meth) acrylate may include at least one selected from the group of 2-hydroxyethyl(meth)acrylate, 4-hydroxybutyl(meth)acrylate, 2-hydroxypropyl(meth)acrylate, 2-hydroxybutyl(meth) acrylate, 6-hydroxyhexyl(meth)acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, 2-hydroxy-3-phenyloxypropyl(meth)acrylate, 4-hydroxycyclopentyl (meth)acrylate, 2-hydroxy-3-phenyloxybutyl(meth)acrylate, and 4-hydroxycyclohexyl(meth)acrylate, without being limited thereto.

The (b2) polyfunctional (meth)acrylate may help increase cross-linking density of a radial cured product to thereby help improve reliability through enhancement of cohesion energy.

The (b2) polyfunctional (meth)acrylate may be a (meth) acrylate of a polyhydric alcohol having about 2 or more, e.g., about 2 to 6 hydroxyl groups. The polyhydric alcohol may include a linear or branched aliphatic $C_3$ to $C_{20}$ polyhydric alcohol, a cyclic $C_6$ to $C_{20}$ polyhydric alcohol containing an isocyanurate group, or a mixture thereof.

In an implementation, the (b2) polyfunctional (meth) acrylate may include trimethylolpropane tri(meth)acrylate, trimethylolpropane trioxyethyl(meth)acrylate, tris(2-(meth) acryloyloxyethyl)isocyanurate, pentaerythritol tri(meth) acrylate, or mixtures thereof.

In an implementation, the (b2) polyfunctional (meth) acrylate may be a polyfunctional (meth)acrylate having an isocyanurate group, e.g., tris(2-(meth)acryloyloxyethyl)isocyanurate.

The (meth)acrylic compound may be modified with ethylene oxide (EO).

The (meth)acrylic compound may be present in an amount of about 1 part by weight to 90 parts by weight, based on 100 parts by weight of total of (A), (B), and (C) (i.e., (A)+(B)+(C) or 100 parts by weight of the epoxy compound, the (meth)acrylic compound, and the polyfunctional thiol compound). Within this range, the composition may help prevent a deterioration in adhesion due to reduction of cohesion, a deterioration in reliability due to generation of tack by reduction in interface adhesion and modulus, and may help provide good water resistance by preventing decolorization of the polarizer when dipped in warm water. In an implementation, the (meth)acrylic radical compound may be present in an amount of about 25 parts by weight to about 90 parts by weight, e.g., about 27 parts by weight to about 49 parts by weight.

The epoxy compound and the (meth)acrylic compound may be present in a weight ratio (A):(B) of about 50:50 to about 90:10, based on 100 parts by weight of total of (A) and (B) (i.e., (A)+(B)). With this weight ratio range, the composition may help provide desired adhesion between the polarizer and the protective film, and high reliability.

Based on total of (A) and (B) (i.e., (A)+(B)), the (A) epoxy compound may be present in an amount of about 41 wt % to about 99.9 wt %, and the (B) (meth)acrylic compound may be present in an amount of about 0.1 wt % to 59 wt %. Within this weight ratio range, the composition may help provide desired adhesion between the polarizer and the protective film, and high reliability. In an implementation, the (A) epoxy compound may be present in an amount of about 50 wt % to about 75 wt %, and the (B) (meth)acrylic compound may be present in an amount of about 25 wt % to about 50 wt %.

Polyfunctional Thiol Compound

The polyfunctional thiol compound may include about 2 or more —SH (thiol) groups, e.g., about 2 to about 10 or about 2 to about 6-SH groups, per molecule.

In the polyfunctional thiol compound, a —SH group may react with a terminal radical of the (meth)acrylic compound activated by the photoinitiator, and a radical of another thiol group may react with another (meth)acrylic compound through activated chain transfer reaction. As a result, a structure formed by the polyfunctional thiol compound and the (meth)acrylic compound may have a network structure, thereby improving cross-linking density.

In addition, the —SH groups may be less influenced by obstructive reaction by oxygen and thus may provide excellent reactivity (as compared with a composition composed of the (meth)acrylic compound alone under the same conditions) thereby improving adhesion of the adhesive layer.

In an implementation, the polyfunctional thiol compound may be a secondary or tertiary thiol compound. A primary thiol compound, referring to a compound wherein a —SH group is bound to a primary carbon atom, may have a short pot life due to self-activation, thereby deteriorating stability. The secondary thiol compound refers to a compound wherein a —SH group is bound to a secondary carbon atom, as represented by Formulae 1A, 1B, and 1C, below, and the tertiary thiol compound refers to a compound wherein a —SH group is bound to a tertiary carbon atom.

The polyfunctional thiol compound may be a reaction product of a linear or branched aliphatic polyhydric alcohol (e.g., a $C_3$ to $C_{20}$ polyhydric alcohol) or an alicyclic polyhydric alcohol having at least one hetero atom selected from nitrogen and oxygen (e.g., a $C_6$ to $C_{20}$ polyhydric alcohol containing isocyanurate), and carboxylic acid containing a mercapto group.

In an implementation, the polyfunctional thiol compound may have a structure represented by Formula 1, below.

[Formula 1]

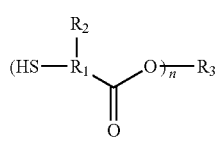

In Formula 1, n may be an integer from 2 to 10, $R_1$ may be a substituted or unsubstituted $C_1$ to $C_{10}$ alkylene group, $R_2$ may be a substituted or unsubstituted $C_1$ to $C_{10}$ alkyl group, and $R_3$ may be a substituted or unsubstituted $C_1$ to $C_{10}$ alkylene group, or a functional group represented by Formula 2, below.

[Formula 2]

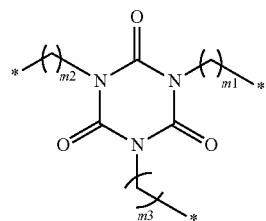

In Formula 2, $m_1$, $m_2$, and $m_3$ may each independently be an integer from 1 to 5; and * may be a binding site to —O— in Formula 1. For example, a polyfunctional thiol compound represented by Formula 1 and including a moiety represented by Formula 2 may be a trifunctional thiol compound.

For $R_1$, $R_2$, and $R_3$, the "alkylene" and "alkyl" groups may be linear or branched.

As used herein, the term "substituted" in "substituted or unsubstituted" means that at least one hydrogen atom is substituted with a $C_1$ to $C_5$ alkyl group, a $C_6$ to $C_{10}$ aryl group, a halogen, a hydroxyl group, an amino group, or the like.

In an implementation, the polyfunctional thiol compound may have a structure represented by Formula 1A, Formula 1B, or Formula 1C, below.

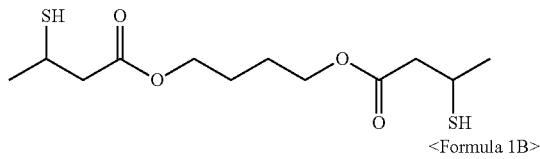

<Formula 1A>

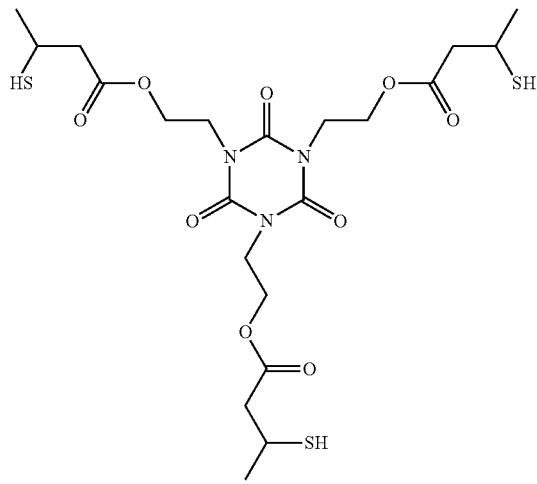

<Formula 1B>

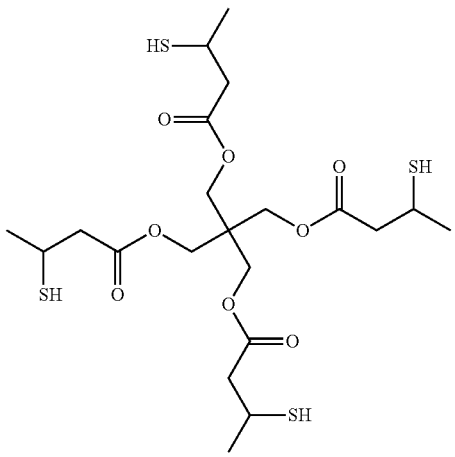

<Formula 1C>

The polyfunctional thiol compound may have a weight-average molecular weight of about 200 g/mol to about 600 g/mol. Within this range, the polyfunctional thiol compound may help provide shrinkage prevention effects by ensuring a suitable hardening rate.

The polyfunctional thiol compound may be present in an amount of about 0.1 parts by weight to 15 parts by weight, based on 100 parts by weight of total of (A), (B) and (C) (i.e., (A)+(B)+(C) or 100 parts by weight of the epoxy compound, the (meth)acrylic compound, and the polyfunctional thiol compound). Within this range, the polyfunctional thiol compound may have high reactivity with the (meth)acrylic compound, may achieve significant improvement in cross-linking density, and may help prevent deterioration in adhesion and durability. In an implementation, the polyfunctional thiol compound may present in an amount of about 0.1 parts by weight to 10 parts by weight, e.g., about 0.1 parts by weight to less than about 5 parts by weight or about 0.1 parts by weight to about 4 parts by weight.

In an implementation, the adhesive composition may further include (D) a photoinitiator.

The photoinitiator may include a photo-radical polymerization initiator, a photo-cationic polymerization initiator, or mixtures thereof. For example, the photoinitiator may be a mixture of a photo-radical polymerization initiator and a photo-cationic polymerization initiator.

The photoinitiator may be present in an amount of about 0.1 parts by weight to 10 parts by weight, based on 100 parts by weight of total of (A), (B), and (C) (i.e., (A)+(B)+(C) or 100 parts by weight of the epoxy compound, the (meth)acrylic compound, and the polyfunctional thiol compound). In an implementation, the photoinitiator may be present in an amount of about 0.5 parts by weight to about 6.0 parts by weight.

The photo-radical polymerization initiator may include a suitable photo-radical polymerization initiator that is capable of carrying out photocuring reaction without limitation.

For example, the photo-radical polymerization initiator may include phosphorus, triazine, acetophenone, benzophenone, thioxanthone, benzoin, oxime initiators, or mixtures thereof. In an implementation, the photo-radical polymerization initiator may include dibenzylphenyl phosphine oxide, benzoyldiphenyl phosphine oxide, or mixtures thereof.

The photo-radical polymerization initiator may be present in an amount of about 0.1 parts by weight to about 6 parts by weight, based on 100 parts by weight of total of (A), (B), and (C) (i.e., (A)+(B)+(C) or 100 parts by weight of the epoxy compound, the (meth)acrylic compound, and the polyfunctional thiol compound). Within this range of the photo-radical polymerization initiator, sufficient polymerization of the (meth)acrylic compound may be achieved, while preventing the initiator from remaining in the composition (e.g., after curing). In an implementation, the photo-radical polymerization initiator may be present in an amount of about 0.1 parts by weight to about 1 part by weight.

A suitable photo-cationic polymerization initiator that is capable of carrying out photocuring reaction may be used as the photo-cationic polymerization initiator.

For example, the photo-cationic polymerization initiator may include onium salt compounds including cation species as onium ion and anion species. Onium ion may include diaryliodoniums, such as diphenyliodonium, 4-methoxydiphenyliodonium, bis(4-methylphenyl)iodonium, bis(4-tert-butylphenyl)iodonium, bis(dodecylphenyl)iodonium, and the like; triarylsulfoniums such as triphenylsulfonium, diphenyl-4-thiophenoxyphenylsulfonium, and the like; bis(4-(diphenylsulfonio)phenyl)sulfide, bis[4-(di(4-(2-hydroxyethyl)phenyl)sulfonio)-phenyl]sulfide, 5-2,4-(cyclopentadienyl)[1,2,3,4,5,6-η]-(methylethyl)-benzenekiron (1$^+$), and the like.

Examples of anion species may include tetrafluoroborate ($BF_4^-$), hexafluorophosphate ($PF_6^-$), hexafluoroantimonate ($SbF_6^-$), hexafluoroarsenate ($AsF_6^-$), hexachloroantimonate ($SbCl_6^-$), and the like.

The photo-cationic polymerization initiator may be present in an amount of about 0.1 parts by weight to 5 parts by weight, based on 100 parts by weight of total of (A), (B), and (C) (i.e., (A)+(B)+(C) or 100 parts by weight of the epoxy compound, the (meth)acrylic compound, and the polyfunctional thiol compound). Within this range, sufficient polymerization of the epoxy compound may be achieved, while preventing initiator from remaining in the composition (e.g., after curing). In an implementation, the photo-cationic polymerization initiator may be present in an amount of about 0.1 parts by weight to 3 parts by weight.

The adhesive composition for polarizing plates may be prepared by blending the epoxy compound, the (meth)acrylic compound, and the polyfunctional thiol compound, followed by adding the photoinitiator (e.g., the photo-cationic polymerization initiator and the photo-radical polymerization initiator may be sequentially added) to the mixture.

The adhesive composition for polarizing plates may further include, e.g., an antioxidant, a UV absorbent, an ionic conductor, an additive for enhancing conductivity such as a conductive metal oxide particle, an additive for light spreading properties, a viscosity adjustor, or the like, in amounts that do not adversely affect the embodiments.

Within the aforementioned ranges of constituent components, the adhesive composition for polarizing plates may have a viscosity at 25° C. of less than about 150 cPs. Within this viscosity range, the adhesive composition may exhibit good coatability. In an implementation, the viscosity of the adhesive composition may be about 1 cPs to about 135 cPs, e.g., about 40 cPs to about 135 cPs.

Another embodiment relates to a polarizing plate that includes an adhesive layer formed of or prepared from the adhesive composition including the polyfunctional thiol compound. For example, the adhesive layer may be formed of or prepared from the adhesive composition for polarizing plates described above.

FIG. 1 illustrates a sectional view of a polarizing plate according to an embodiment. Referring to FIG. 1, a polarizing plate 100 may include a polarizer 10, a first protective film 20 on an upper side of the polarizer 10, and a second protective film 30 on a lower side of the polarizer 10. A first adhesive layer 40 may be between the first protective film 20 and the polarizer 10, and a second adhesive layer 50 may be between the polarizer 10 and the second protective film 30. Here, at least one of the first and second adhesive layers 40, 50 may include an adhesive layer formed of or prepared from the adhesive composition for polarizing plates according to an embodiment.

As used herein, the terms "upper" and "lower" are defined with reference to the drawings and may also be interpreted as "lower" and "upper" according to orientation.

In FIG. 1, the adhesive layers formed of the adhesive composition for polarizing plates according to the embodiment may be respectively formed on both sides of the polarizer to form the adhesive layer. However, in an implementation, the adhesive layer formed of the adhesive composition may be formed only on one side of the polarizer. The adhesive layers formed on both sides of the polarizer may be the same or different.

The polarizer may be prepared from a film of a polyvinyl alcohol resin. Examples of the polyvinyl alcohol resin may include saponified products of polyvinyl alcohol, polyvinyl formal, polyvinyl acetal, ethylene acetate vinyl copolymer, and the like. A film formed of a polyvinyl alcohol resin may have a degree of saponification of about 99 or more, e.g., about 99 to about 99.5, a degree of polymerization of about 2,000 or more, e.g., about 2,000 to about 2,500, and a thickness of about 10 μm to about 200 μm.

The polarizer may be prepared by dyeing a polyvinyl alcohol resin film with iodine and stretching the polyvinyl alcohol resin film. The film may be stretched in a ratio of about 2.0 to about 6.0. After stretching, the film may be subjected to color correction through dipping in a boric acid solution and an aqueous potassium iodide solution.

The prepared polarizer may have a thickness of about 10 µm to about 200 µm.

The protective film may be stacked on one or both sides of the polarizer and a suitable transparent film for use as a protective film for a polarizing plate may be used without limitation. The protective film may be prepared from a material selected from the group of celluloses including triacetyl cellulose (TAC), polyesters including polyethylene terephthalate (PET), cyclic olefin polymers (COP), polycarbonates (PC), polyacrylates, polyethersulfones, polysulfones, polyamides, polyimides, polyolefins, polyarylates, polyvinyl alcohols, polyvinyl chlorides, polyvinylidene chlorides, and mixtures thereof.

The protective film may have a thickness of about 25 µm to about 500 µm. Within this thickness range, the protective film may be applied to the polarizing plate. In an implementation, the protective film may have a thickness of about 25 µm to about 100 µm.

The protective film may be subjected to surface treatment, e.g., corona pretreatment at about 250 mJ/cm$^2$ or more, before application of the adhesive composition or before preparation of the polarizing plate.

The adhesive layer may be formed of the adhesive composition for polarizing plates. The adhesive layer may have a thickness of about 0.1 µm to about 5 µm.

The polarizing plate may be prepared by a suitable method. For example, a protective film having an adhesive composition layer including the adhesive composition may be prepared by depositing the adhesive composition on one side of the protective film. As desired, the protective film having the adhesive composition layer may be subjected to drying or the like. The adhesive composition may be deposited by, e.g., die coating, roll coating, gravure coating, spin coating, and the like. Then, a stacked product may be prepared by stacking the protective film having the adhesive composition layer on each of upper and lower surfaces of a polarizer. The adhesive composition layer may be cured by UV irradiation to form an adhesive layer. A polarizing plate may be prepared using the adhesive layer.

Although an intensity of UV irradiation is not particularly limited, UV irradiation may be performed at a wavelength of about 200 nm to about 450 nm and a radiant flux density of about 1 mW/cm$^2$ to about 500 mW/cm$^2$ for a final UV radiant exposure of about 10 mJ/cm$^2$ to about 10,000 mJ/cm$^2$. UV irradiation may be performed using a metal halide lamp or the like. UV irradiation may be performed at a temperature from about 22° C. to about 25° C. and a relative humidity from about 20% to about 60%.

The polarizing plate according to an embodiment may have high cohesion, durability, and cross-linking density, thereby providing high adhesion/reliability.

Another embodiment relates to an optical member including the adhesive composition for polarizing plates, an adhesive layer formed of the adhesive composition, or a polarizing plate including the same. The optical member may be a suitable optical member including the polarizing plate, and may include, e.g., a display device.

Figure 2:
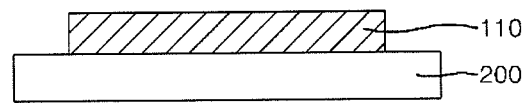
FIG. 2 illustrates a sectional view of an optical member in accordance with an embodiment.

FIG. 2 illustrates a sectional view of an optical member in accordance with an embodiment.

Referring to FIG. 2, the optical member may include a panel 200 and a polarizing plate 110 on an upper side of the panel 200.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Detailed components of adhesive compositions used in the following examples and comparative examples were as follows.

A. Epoxy compound:
(A1) Bisphenol A aromatic epoxy (KDS-8128, Kukdo Chemical)
(A2) Hydrogenated epoxy (YX-8000, JER)
(A3) Alicyclic epoxy (SEE-4221, Seechem)
B. (Meth)acrylic compound:
(B1) 2-hydroxyethyl acrylate (100%, SK Cytec)
(B2) 4-hydroxybutyl acrylate (100%, Osaka Organic Chemical Industry)
(B3) M-315 (100%, Toagosei)
C. Polyfunctional thiol compound:
(C1) 1,4-bis(3-mercapto butyryloxy)butane (KarenzMT BD1, Showa Denko)
(C2) 1,3,5-tris(3-mercaptobutyryloxyethyl)-1,3,5-triazine-2,4,6(1H,3H,5H)-trione (KarenzMT NR1, Showa Denko)
(C3) Pentaerythritol tetrakis(3-mercaptobutyrate) (KarenzMT PE1, Showa Denko)
D. Photoinitiator:
(D1) Photo-cationic polymerization initiator: triarylsulfonium hexafluoroantimonate salt (CPI-100P)
(D2) Photo-radical polymerization initiator: 2,4,6-trimethylbenzoyl-diphenylphosphine oxide (Darocure TPO, Ciba)

Examples and Comparative Example

Without using a solvent, the epoxy compound, the (meth)acrylic compound, and the polyfunctional thiol compound were mixed in amounts as shown in Table 1 (Unit: parts by weight). Then, 2 parts by weight of the photo-cationic polymerization initiator and 1 part by weight of the photo-radical polymerization initiator were added to the mixture, thereby preparing adhesive compositions for polarizing plates.

TABLE 1

|  | (A) | | | (B) | | | (C) | | |
| --- | --- | --- | --- | --- | --- | --- | --- | --- | --- |
|  | (A1) | (A2) | (A3) | (B1) | (B2) | (B3) | (C1) | (C2) | (C3) |
| Example 1 | 50 | — | — | 49 | — | — | 1 | — | — |
| Example 2 | 50 | — | — | 47 | — | — | 3 | — | — |
| Example 3 | — | 50 | — | 47 | — | — | 3 | — | — |
| Example 4 | — | — | 50 | 47 | — | — | 3 | — | — |
| Example 5 | 50 | — | — | — | 47 | — | 3 | — | — |
| Example 6 | 50 | — | — | — | 47 | — | — | 3 | — |
| Example 7 | 50 | — | — | — | 47 | — | — | — | 3 |
| Example 8 | 70 | — | — | — | 27 | — | — | 3 | — |

TABLE 1-continued

| | (A) | | | (B) | | | (C) | | |
|---|---|---|---|---|---|---|---|---|---|
| | (A1) | (A2) | (A3) | (B1) | (B2) | (B3) | (C1) | (C2) | (C3) |
| Example 9 | 50 | — | — | — | 45 | — | — | 5 | — |
| Example 10 | 50 | — | — | — | 40 | — | — | 10 | — |
| Example 11 | 50 | — | — | 44 | — | 4 | — | 2 | — |
| Example 12 | 50 | — | — | 40 | — | 4 | — | 6 | — |
| Comparative Example 1 | 40 | — | — | 60 | — | — | — | — | — |

Preparation of Polarizing Plate

An 80 μm thick polyvinyl alcohol film (degree of saponification: 99.5, degree of polymerization: 2,000) was used for preparing a polarizer. The polyvinyl alcohol film was dipped in a 0.3% iodine aqueous solution for dyeing and was subjected to stretching to a ratio of 5.0. Then, the stretched polyvinyl alcohol film was dipped in a boric acid solution at a concentration of 3% and an aqueous solution of 2% potassium iodide for color correction, followed by drying at 50° C. for 4 minutes, thereby preparing a polarizer.

As a first transparent protective film, an 80 μm thick cellulose triacetate (TAC) film was used and subjected to corona treatment at 250 mJ/cm² or more.

As a second transparent protective film, a 30 μm thick cyclic olefin polymer (COP) film was used and subjected to corona treatment at 250 mJ/cm² or more.

A polarizing plate was prepared by combining the first protective film, the adhesive composition, the polarizer, the adhesive composition and the second protective film in this order at 22~25° C. and 20~60% RH, followed by UV irradiation at 400 mW/cm² to 1000 mJ/cm² using a metal halide lamp.

The following properties of the adhesive compositions for polarizing plates as prepared above were evaluated. Results are shown in Table 2, below.

(1) Gel Fraction: Each of the adhesive compositions was cured under conditions of 400 mW/cm² and 1,000 mJ/cm², and stabilized at 35° C. and 45% RH for 24 hours, followed by measuring the weight (G1) of the cured adhesive composition. The cured adhesive composition was dipped in a sufficient amount of chloroform for 2 hours, and dried at 100° C. for 2 hours, followed by measuring the weight (G2) of the adhesive composition. Then, the gel fraction of the adhesive composition was calculated by Equation: G2/G1× 100(%). The gel fraction can be used to evaluate post-curing cross-linking density of the adhesive composition. Higher gel fraction indicates a higher cross-linking density.

(2) Adhesion: To confirm adhesion of the polarizing plates, a cutter blade was inserted into a portion between the protective film and the polarizer at one end of each polarizing plate. No insertion of the cutter blade between the protective film and the polarizer was evaluated as ⊚, slight insertion of the cutter blade was evaluated as ○, slight insertion of the cutter blade and tearing of the protective film due to strength thereof was evaluated as Δ, and easy insertion of the cutter blade was evaluated as X.

(3) Cutability: To confirm cutability of the polarizing plates, each of the polarizing plates prepared in the examples and the comparative examples having a size of 500 mm×500 mm was punched from the protective film (80 μm thick triacetate cellulose (TAC)) side using a cutter blade. The peeled state of one end at four sides of the punched polarizing plate was visibly observed. No peeling was evaluated as ⊚, peeling to a length of greater than 0 mm to 1 mm or less was evaluated as ○, peeling to a length of greater than 1 mm to 2 mm or less was evaluated as Δ, and peeling to a length of greater than 2 mm was evaluated as X.

(4) Water resistance (warm water dipping testing): Each of the polarizing plates prepared in the Examples and the Comparative Example was cut to a size of 5 cm×5 cm (length×width). Each of the prepared samples was dipped in temperature-constant water at 60° C. for 2 hours. Decoloration of the polarizer and maximum shrinkage length at one end of the polarizer were measured. Shrinkage length means the shortest distance from one end of the protective film to one end of the polarizer adjacent the one end of the protective film in the polarizing plate in the course of warm water dipping test. Although the protective film did not shrink during water resistance testing, the polarizer shrunk when dipped in warm water. No decoloration of the polarizer was evaluated as ⊚ (shrinkage length of 2 mm or less), partial decoloration was evaluated as Δ (shrinkage length of 3 mm or less to more than 2 mm), and complete decoloration was evaluated as X (shrinkage length of more than 3 mm).

TABLE 2

| | Gel Fraction (%) | Adhesion | | Cutability | Water Resistance |
|---|---|---|---|---|---|
| | | TAC side | COP side | | |
| Example 1 | 92.3 | ⊚ | ○ | ○ | ⊚ |
| Example 2 | 95.5 | ⊚ | ○ | ⊚ | ⊚ |
| Example 3 | 94.1 | ⊚ | ○ | ○ | ⊚ |
| Example 4 | 91.0 | ○ | ⊚ | ○ | ⊚ |
| Example 5 | 94.7 | ⊚ | ○ | ⊚ | ⊚ |
| Example 6 | 96.1 | ⊚ | ○ | ⊚ | ⊚ |
| Example 7 | 96.5 | ⊚ | ⊚ | ⊚ | ⊚ |
| Example 8 | 89.3 | ⊚ | ⊚ | ⊚ | ⊚ |
| Example 9 | 93.6 | ○ | ⊚ | ⊚ | ⊚ |
| Example 10 | 91.2 | ○ | ⊚ | ⊚ | ⊚ |
| Example 11 | 97.5 | ⊚ | ⊚ | ⊚ | ⊚ |
| Example 12 | 95.5 | ⊚ | ⊚ | ⊚ | ⊚ |
| Comparative Example 1 | 82.0 | Δ | Δ | Δ | Δ |

As may be seen in Table 2, the polarizing plates including adhesive layers formed of the adhesive compositions according to the Examples had high cross-linking density due to a high gel fraction, exhibited good adhesion, cutability, and water resistance, and thus did not cause separation of the polarizer during warm water dipping testing.

On the contrary, the adhesive composition prepared in Comparative Example 1, e.g., without the polyfunctional thiol compound, exhibited undesirable properties in terms of cross-linking density, adhesion, cutability and water resistance, as compared with the adhesive compositions according to the Examples, and thus did not provide advantageous effects of the embodiments.

By way of summation and review, the cation polymerizable UV curing adhesive may entail a dark reaction (postpolymerization) after UV irradiation. Thus, a cured product of the adhesive may be easily wound during storage when prepared in the form of a wound roll. Moreover, the cation polymerizable UV curing adhesive may be vulnerable to moisture in the course of curing, thereby making it difficult to maintain curing consistency. Thus, in order to obtain a uniformly cured state, it may be desirable to strictly control not only surrounding moisture, but also the content of moisture in a PVA-based polarizer.

In order for the polarizing plate to withstand harsh environmental conditions, a polarizing plate should include an adhesive layer that has higher cross-link density than other adhesives applied to polarizing plates and that exhibits strong adhesion, high durability, and excellent humidity resistance.

The embodiments provide an adhesive composition for polarizing plates, which may be used to attach a protective film to one or both sides of a polarizer formed of PVA (poly vinyl alcohol) and the like and may form an adhesive layer having excellent properties in terms of cross-linking density, adhesion, durability, and water resistance.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A polarizing plate, comprising:
   a polarizer; and
   a protective film stacked on one or both sides of the polarizer, the protective film being attached directly on the polarizer with an adhesive layer, wherein the adhesive layer is prepared from an adhesive composition for polarizing plates, the adhesive composition including:
   an epoxy compound,
   a methacrylic compound or an acrylic compound, and
   a polyfunctional thiol compound,
   wherein the adhesive layer has a gel fraction after 24 hours of 89.3% to 97.5%.

2. The polarizing plate as claimed in claim 1, wherein the polyfunctional thiol compound is present in an amount of about 0.1 parts by weight to about 15 parts by weight, based on 100 parts by weight of the epoxy compound, the methacrylic compound or acrylic compound, and the polyfunctional thiol compound.

3. The polarizing plate as claimed in claim 1, wherein the polyfunctional thiol compound is present in an amount of about 0.1 parts by weight to less than about 5 parts by weight, based on 100 parts by weight of the epoxy compound, the methacrylic compound or acrylic compound, and the polyfunctional thiol compound.

4. The polarizing plate as claimed in claim 1, wherein a weight ratio of the epoxy compound to the methacrylic compound or acrylic compound in the adhesive composition is about 50:50 to about 90:10.

5. The polarizing plate as claimed in claim 1, wherein the polyfunctional thiol compound has a structure represented by Formula 1:

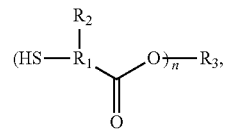

[Formula 1]

wherein, in Formula 1, n is an integer from 2 to 10, $R_1$ is a substituted or unsubstituted $C_1$ to $C_{10}$ alkylene group, $R_2$ is a substituted or unsubstituted $C_1$ to $C_{10}$ alkyl group, and $R_3$ is a substituted or unsubstituted $C_1$ to $C_{10}$ alkylene group, or a functional group represented by Formula 2:

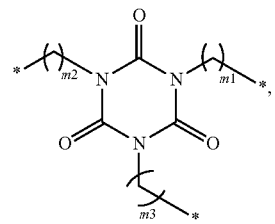

[Formula 2]

wherein, in Formula 2, $m_1$, $m_2$, and $m_3$ are each independently an integer from 1 to 5; and * is a binding site to —O— in Formula 1.

6. The polarizing plate as claimed in claim 1, wherein the polyfunctional thiol compound includes 1,4-bis(3-mercaptobutyryloxy)butane, 1,3,5-tris(3-mercaptobutyryloxyethyl)-1,3,5-triazine-2,4,6(1H,3H,5H)-trione, pentaerythritol tetrakis(3-mercaptobutyrate), or a mixture thereof.

7. The polarizing plate as claimed in claim 1, wherein the epoxy compound includes an alicyclic epoxy compound, an aromatic epoxy compound, an aliphatic epoxy compound, a hydrogenated epoxy compound, or a mixture thereof.

8. The polarizing plate as claimed in claim 1, wherein the methacrylic compound or acrylic compound includes a monofunctional methacrylate having at least one hydrophilic group, a monofunctional acrylate having at least one hydrophilic group, a polyfunctional methacrylate of a polyhydric alcohol having 2 or more hydroxyl groups, a polyfunctional acrylate of a polyhydric alcohol having 2 or more hydroxyl groups, or a mixture thereof.

9. The polarizing plate as claimed in claim 8, wherein the polyfunctional methacrylate of a polyhydric alcohol having 2 or more hydroxyl groups or the polyfunctional acrylate of a polyhydric alcohol having 2 or more hydroxyl groups is present in the methacrylic compound or acrylic compound in an amount of about 10 wt % or less.

10. The polarizing plate as claimed in claim 8, wherein the methacrylic compound or acrylic compound includes the polyfunctional methacrylate of a polyhydric alcohol having 2 or more hydroxyl groups or the polyfunctional acrylate of a polyhydric alcohol having 2 or more hydroxyl groups, the polyhydric alcohol having 2 or more hydroxyl groups including a linear or branched $C_3$ to $C_{20}$ polyhydric alcohol, a cyclic $C_6$ to $C_{20}$ polyhydric alcohol containing an isocyanurate group, or a mixture thereof.

11. The polarizing plate as claimed in claim 1, wherein the adhesive composition further includes a photoinitiator.

12. The polarizing plate as claimed in claim 11, wherein the photoinitiator includes a mixture of a photo-radical polymerization initiator and a photo-cationic polymerization initiator.

13. The polarizing plate as claimed in claim 11, wherein the adhesive composition includes:
   about 1 part by weight to about 90 parts by weight of the epoxy compound;
   about 1 part by weight to about 90 parts by weight of the methacrylic compound or acrylic compound;
   about 0.1 parts by weight to about 15 parts by weight of the polyfunctional thiol compound; and
   about 0.1 part by weight to about 10 parts by weight of the photoinitiator, wherein all amounts are based on 100 parts by weight of the epoxy compound, the methacrylic compound or acrylic compound, and the polyfunctional thiol compound.

14. The polarizing plate as claimed in claim 1, wherein the adhesive composition has a viscosity at 25° C. of about 40 cPs to about 135 cPs.

15. The polarizing plate as claimed in claim 1, wherein the polyfunctional thiol compound includes two to six thiol groups.

16. An optical member comprising an adhesive film, the adhesive film being prepared from an adhesive composition for polarizing plates, wherein the adhesive composition includes:
   an epoxy compound,
   a methacrylic compound or an acrylic compound, and
   a polyfunctional thiol compound,
   wherein the adhesive film has a gel fraction after 24 hours of 89.3% to 97.5%.

* * * * *